(12) United States Patent
Fragnoli

(10) Patent No.: US 8,166,688 B1
(45) Date of Patent: May 1, 2012

(54) DEVICE FOR SECURING IDENTIFICATION

(76) Inventor: Kathy Fragnoli, Dallas, TX (US)

( * ) Notice: Subject to any disclaimer, the term of this patent is extended or adjusted under 35 U.S.C. 154(b) by 78 days.

(21) Appl. No.: 12/319,502

(22) Filed: Jan. 8, 2009

Related U.S. Application Data

(63) Continuation-in-part of application No. 11/820,419, filed on Jun. 19, 2007, now abandoned.

(51) Int. Cl.
*G09F 3/18* (2006.01)
*G09F 3/00* (2006.01)
(52) U.S. Cl. .................................. 40/661; 40/654.01
(58) Field of Classification Search ............... 40/661, 40/654.01
See application file for complete search history.

(56) References Cited

U.S. PATENT DOCUMENTS

| | | | | |
|---|---|---|---|---|
| 2,925,675 A | * | 2/1960 | Lumpkin | 40/643 |
| 4,896,027 A | * | 1/1990 | Drexler | 235/488 |
| 6,103,326 A | * | 8/2000 | Kobayashi | 428/40.1 |

* cited by examiner

*Primary Examiner* — Joanne Silbermann
*Assistant Examiner* — Syed A Islam
(74) *Attorney, Agent, or Firm* — Jeffrey Roddy

(57) ABSTRACT

A device for securing identification to a mounting surface includes an elongated mounting device having a front surface and a rear surface and at least one opening between the surfaces wherein an identification means may be inserted or removed and an adhesive applied to the rear surface of tile mounting device for adhering the mounting device to the mounting surface where the opening is a sleeve formed by a laminate of plastic film adhering to a predetermined pattern of applied adhesive to a rear surface. The device may be economically created in multiples using adhesive label stock in either roll or sheet form.

2 Claims, 5 Drawing Sheets

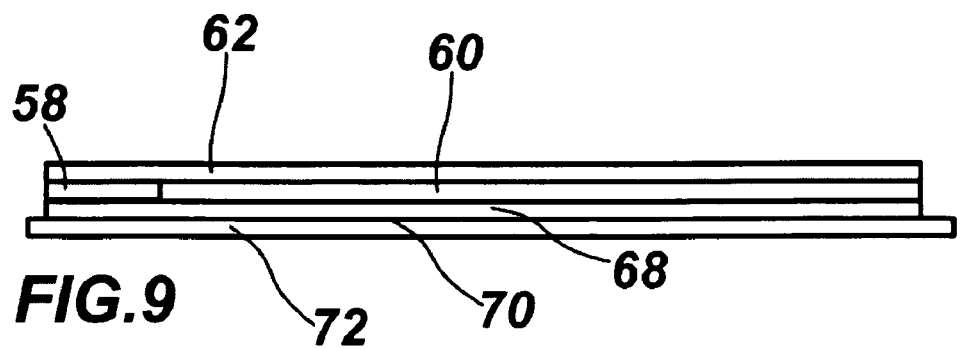
FIG. 9
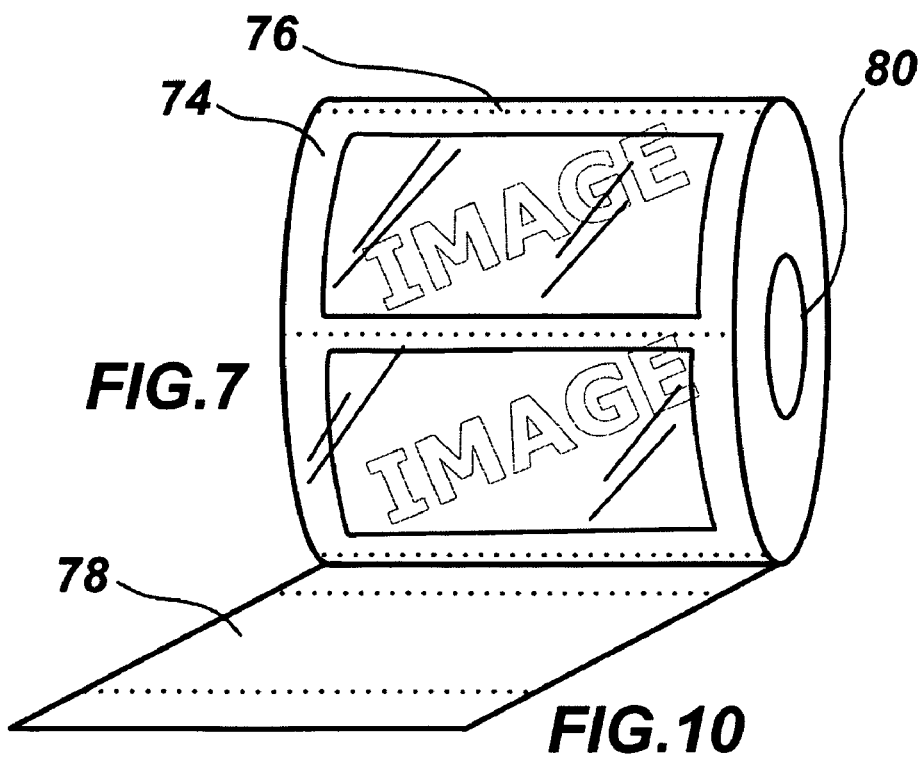
FIG. 7
FIG. 10

DEVICE FOR SECURING IDENTIFICATION

CROSS REFERENCE TO RELATED APPLICATIONS

This application is a Continuation in Part of U.S. patent application Ser. No. 11/820,419 filed Jun. 19, 2007 now abandoned

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to a sleeve into which means of identification such as a business card or distinctive logo may be inserted and that may be affixed to a mounting surface and to a method of affixing a mounting surface a sleeve for receiving means of identification. Also disclosed is a method of manufacture whereby the present invention may be manufactured in masse within a printing house using extant technology.

2. Related Art

Personal items such as mobile telephones, personal digital assistants (PDA), laptop computers, documents, brochures, and portfolios are often generic in appearance, particularly if the owner's name is not obviously displayed on the device or item. Mistakes in the identity of the owner of such a device may occur and an unintended person may pick up the wrong device if the owner is not clearly identified.

Such personal items are frequently small and may be overlooked when the owner leaves a public area such as an airport check-in or a conference room. The generic appearance of such devices may hinder the owner's ability to locate the device or a finder's efforts to locate the owner if the identity of the owner is not obvious.

Brochures, portfolios and similar documents are often used to deliver a message or to provide information from a person that desires to be readily identified by the recipient of the information. It may be desirable to secure a business card or other form of identification to a document, brochure or a portfolio or the like so that the identifying device can be readily removed and separately stored. The use of staples, paper clips, tape, slits in the paper, or the like result in a sloppy appearance and may damage the identifying document and/or underlying surface.

SUMMARY OF THE INVENTION

The present invention provides a device and a method for securing identification such as a business card to a mounting surface that provides a unique identification for the object. In accordance with an aspect of the present invention, the present invention provides for a device and method for removably securing a means of identification to a mounting surface that includes an elongated sleeve having a front surface and a rear surface and a perimeter, the front surface being attached to the rear surface by at least a portion of the perimeter forming a pocket, said pocket having at least one opening between the front surface and the rear surface, and an adhesive on the back of the rear surface to adhere the rear surface to the mounting surface.

The present invention further provides a device and a method for removably securing identification to a document or folder which does not mutilate the identification or the mounting surface when the identification is removed.

The present invention further provides a device and a method for securing identification to a mounting surface that provides a message thereon that is separate from the identification.

The present invention further provides a method of manufacture using extant printing house machinery and materials to produce multiples of an embodiment according to the present invention at minimal cost.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 9 is a sectional view taken along lines 65'-65 of FIG. 8;

FIG. 10 is a perspective view of an embodiment of a mounting device according to the present invention created in multiples on a roll of adhesive label stock.

DESCRIPTION OF THE PREFERRED EMBODIMENTS

In the following description, numerous details are set forth to provide an understanding of the present invention. It should be understood by those of ordinary skill in the art that the present invention may be practiced without these details and that numerous variations or modifications from the described embodiments may be possible. The specific embodiments discussed herein are merely illustrative of specific ways to make and use the invention and do not delimit the scope of the present invention.

Figure 1:
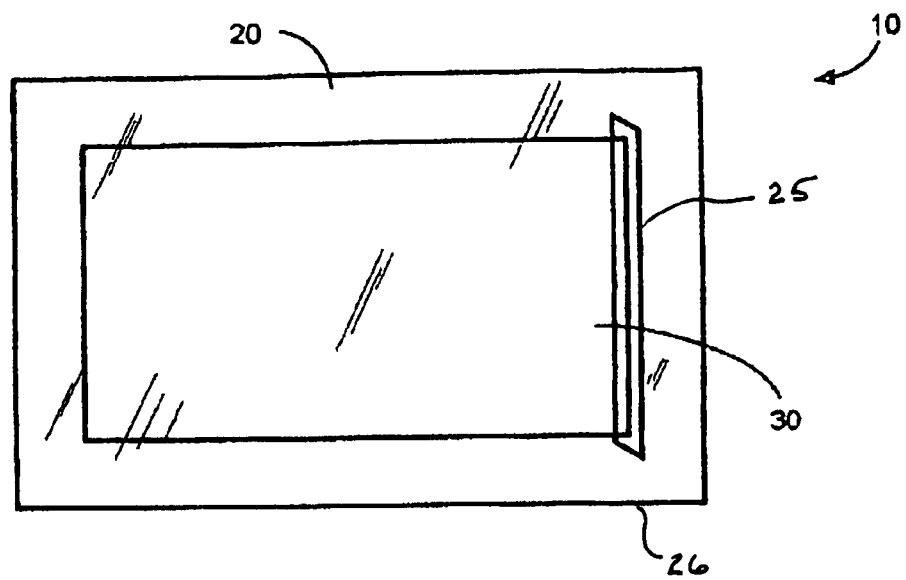
FIG. 1 a plan view of a rectangular sleeve according to an embodiment of the present invention.
Figure 4:
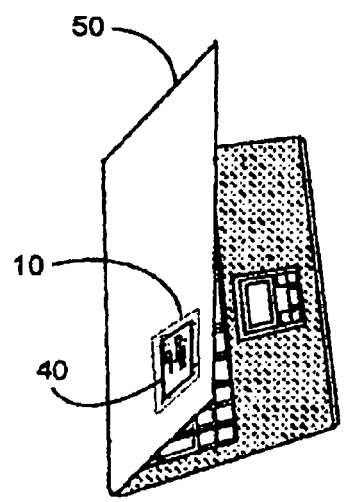
FIG. 4 is an isometric view of the device of FIG. 3, for securing a business card to a surface according to an embodiment of the present invention, affixed to a portable electronic device.

Referring generally to FIG. 1 and FIG. 4 the present invention relates to a mounting device 10 and a method for securing an identification device to a mounting surface 50.

Figure 5:
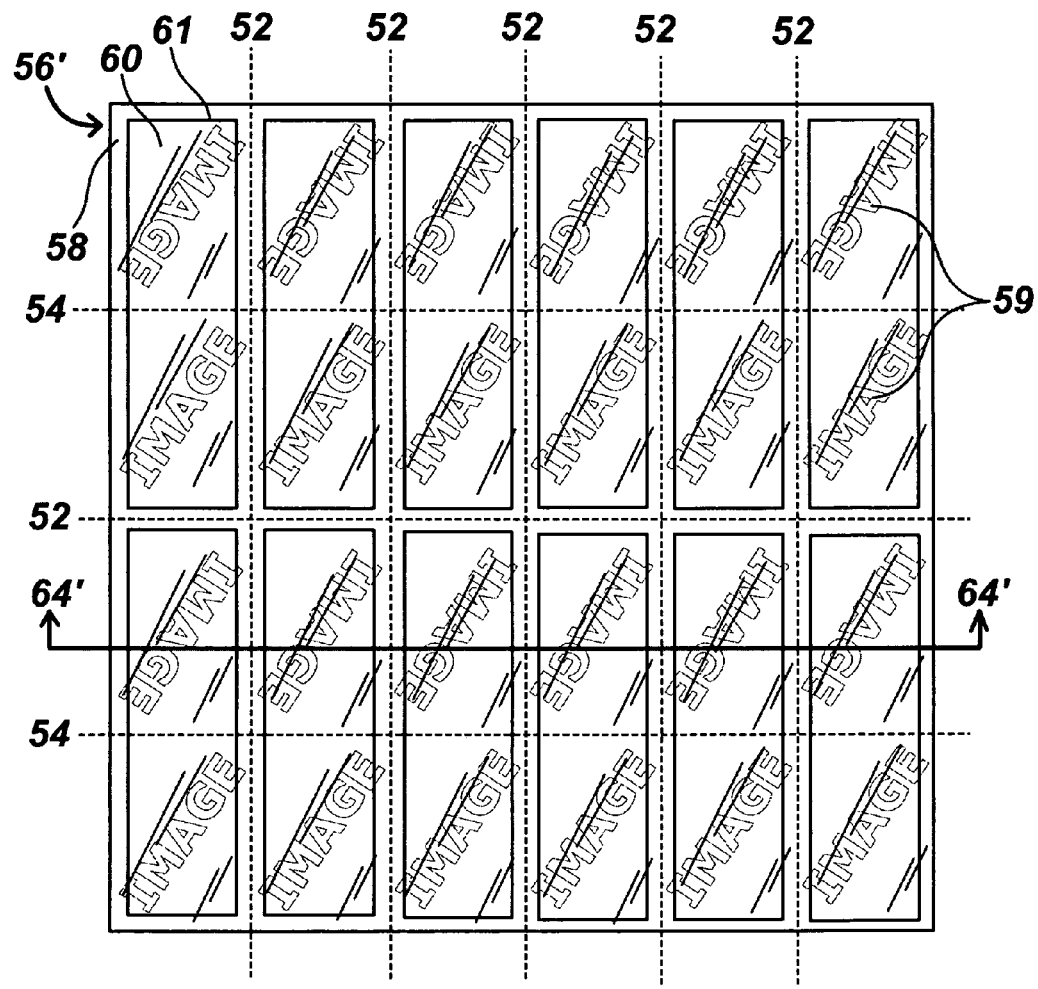
FIG. 5 is a plan view of one embodiment of a device according to the present invention where the mounting devices as shown in FIGS. 1-2, are created in multiples on a sheet of adhesive label stock with a laminated clear covering.
Figure 6:
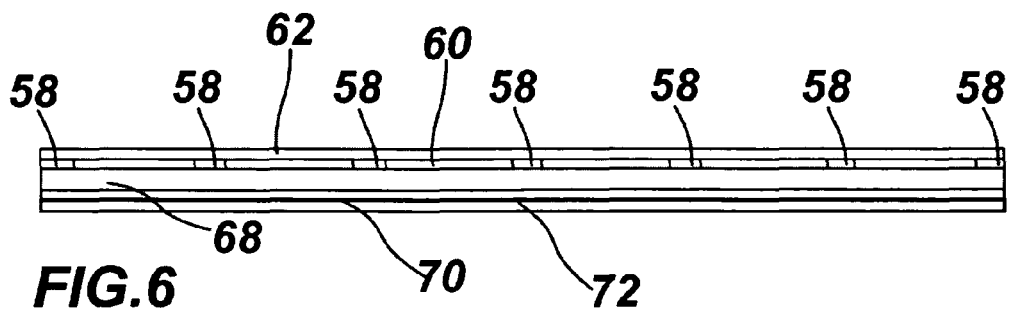
FIG. 6 is a sectional view taken along lines 64'-64' of FIG. 5 showing the layers of one embodiment of the present invention with the thicknesses of the materials exaggerated for clarity.

Referring generally to FIGS. 5-10, the mounting device 10 may be produced in multiples by obtaining adhesive label stock, with a printable substrate having a printable face 68 and a back having a pressure sensitive removable adhesive 70; preferably an emulsion type acrylic adhesive with minimal building of adhesion over time. While label stock such as 3M™ Polyester Label Material 5771 or 5771NF with 3M™ removable adhesive 550 offer a gloss white polyester face and peel away backing 72 such as kraft paper or a polyester backing because of excellent water repellant characteristics, any coated label stock having a pressure sensitive adhesive 70 that is either removable or permanent and having a peel away backing 72 may be used if susceptibility to moisture damage is a minor concern. A predetermined pattern of applied adhesive 58 which is preferably a UV curing type, is either rolled or screen printed upon the face 68, and a layer of plastic film 62, a translucent polyester film is applied on top of the face 68 where it selectively adheres to the predetermined pattern of applied adhesive 58 after exposing to UV light and forms a closed pocket 60 with the bonded adhesive and plastic film defining the bounds of the pocket. The laminate of plastic film and substrate is then die cut to delimit the device size and open at least one end of the pocket now forming a sleeve. The die cutting creates a periphery of disposable material about the pocket that is kiss-cut to the peel away backing material so it may be removed exposing a periphery of peel away backing 72 that is removed prior to adhering the device to a mounting surface. Normally, printing of the face 68 would occur prior to the application of the predetermined pattern of applied adhesive 58 and the adhering of plastic film 62 to the face. As will be understood by one skilled in the art, the plastic film may be in sheet form, or in roll form applied as a secondary web to the primary web of the substrate by a roll die cutter which is often paired with laminating functions. FIG. 6 shows a sectional view of a sheet containing multiple devices taken along lines 64'-64' of FIG. 5 with the thicknesses of the materials exaggerated for clarity. FIG. 9 shows a sectional view of the device after separation from a sheet of multiples taken along lines 65'-65 of FIG. 8 with the thicknesses of the materials exaggerated for clarity.

Offset printing is the preferred means of printing on the face 68, although other processes such as flexography, thermal transfer, or laser printing may be used.

While any multiple of the mounting devices may be produced quickly and efficiently using conventional print process machinery, it should be understood that there are various methods available to one skilled in the art by which the final product may be derived. The specific examples discussed below are merely illustrative of specific methods to create the invention and do not delimit the scope of the present invention.

Example One

Figure 7:
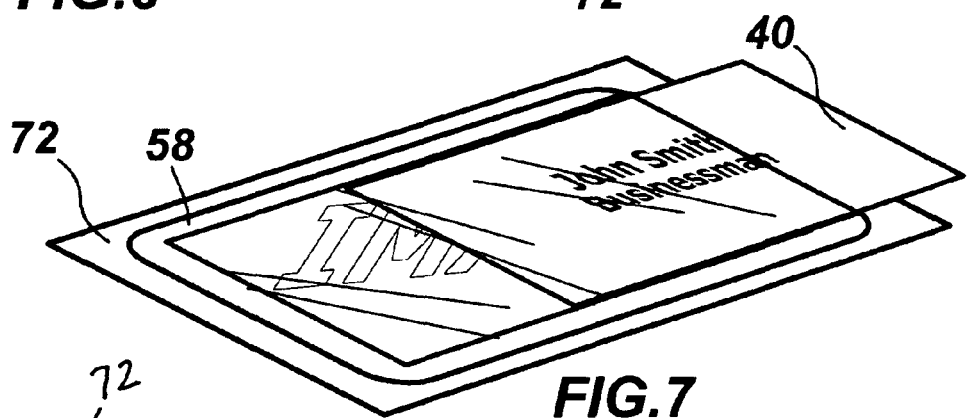
FIG. 7 is a perspective view of one embodiment according to the present invention of a mounting device having been die cut and separated from the sheet of FIG. 5 and showing a business card being inserted therein.
Figure 8:
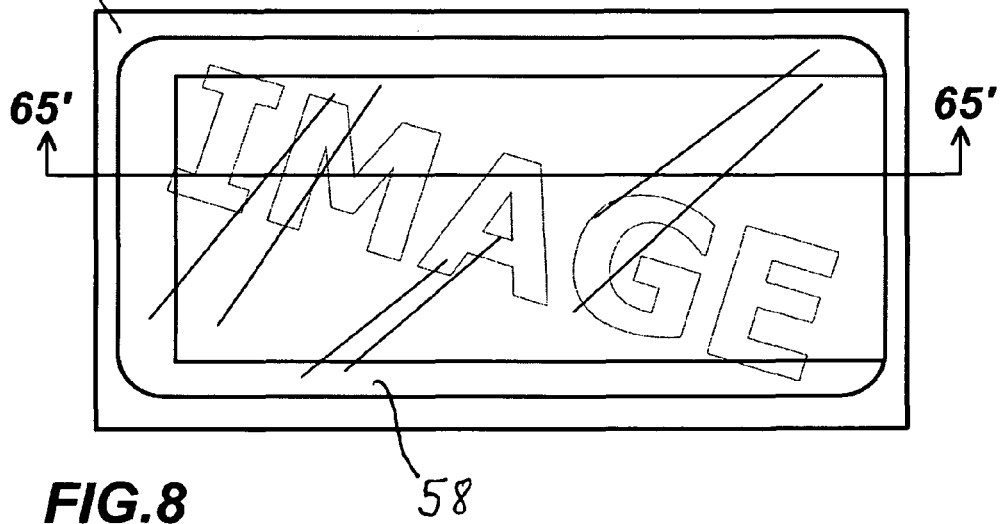
FIG. 8 is a plan view of one embodiment according to the present invention of a mounting device having been die cut and separated from the sheet of FIG. 5.

Referring generally to FIGS. 5-7, in order to produce an embodiment according to the present invention where an identification mounting secures, for example, a business card for display the following steps are followed:

a) a quantity of suitable adhesive blank label stock 56' is obtained;
b) an offset press is used to print a plurality of image pairs 59 where each image is a reversed relative of the other;
c) a UV curable adhesive such as Lomaprint SPA 1000 from Lohmann GmbH & Co. KG of Neuwied Germany, is applied by screen printing over the face stock in a pattern defining the borders 58 of each image pair 59;
d) a layer of transparent material 62 such as cellophane or clear polyester film (PET) is applied over the face 68 and laminated thereon;
e) a conveyor moves the printed and laminated sheet stock to a UV light curing area adhering the clear film to the face whereby,
   i) a closed pocket 60 is first formed over the image pair being adhered along the periphery 61 of the image pair to the face 68;
e) a roll die cut machine is used to define the edges of each mounting device by,
   i) cutting through the face to the backing material 72 and bi-secting 54 the image pairs thereby opening pockets 60 along one edge, creating multiple sleeve pairs;
   ii) leaving a peel away border of excess face material 68 about the periphery of each mounting device that is kiss-cut by roll die cutting through to the backing material 72;
f) the mounting devices may be separated from the sheet by shearing, cutting or slitting 52 along the defined borders 58 or a series of perforation lines may be applied in the area between the mounting devices for later separation.

Example Two a) a roll 80 of suitable adhesive blank label stock is obtained;
b) the roll 80 stock is printed on a flexographic press, each mounting device area being printed with like images in like orientation 75;
c) a UV curable adhesive is applied to the roll in a pattern 74 defining the inside boundaries of a pocket;
d) a clear polyester film 62 is applied continuously to the roll;
e) a conveyor means moves the printed and laminated sheet stock to a UV light curing area adhering the polyester film to the face whereby,
   i) a sleeve 60 with an opening along one end is first formed over an image being adhered along the periphery of the image directly to the face;
f) a roll die cutting machine is used to define the edges of each mounting device by,
   i) leaving a border of liner material about the periphery of the mounting device;
g) the mounting devices may be separated from the sheet by shearing, cutting, slitting, or a series of demarkations 76 are applied in the area between the mounting devices preferably by perforation lines.

Referring to FIG. 1 and FIG. 4, once separated from the sheet or roll, the mounting devices 10 include a top clear layer over defining a front surface 30 attached to a back surface 20 with an opening there between 25 for the insertion of an identification device 40 such as a business card or other identification tag.

In an alternative embodiment of the invention, the mounting device may be a layer of transparent or translucent material folded and sealed to form a sleeve.

The mounting device 10 may have any number of sides comprising its perimeter 26 and a variety of shapes 15.

The mounting device 10 may have any number of openings 25 for insertion of an identification device 40 such as a business card or logo.

The front face of the mounting device 10 may have an ornate design.

The front face of the mounting device 10 may be printed with words, letters, numbers. symbols or any combination of characters and/or designs.

The front surface of the mounting device 30 may be a transparent material to permit the contents of the identification device 40 to be seen from the outside of the front surface 30.

The back of the rear surface 20 of the mounting device 10 may have affixed an adhesive for attaching the sleeve to a mounting surface 50 such as a laptop computer, a portfolio, a personal digital assistant (PDA), a document or the like.

The adhesive may be a permanent adhesive to prevent removal of the mounting device 10 or may be a releasable adhesive to permit removal or the mounting device 10.

Figure 2:
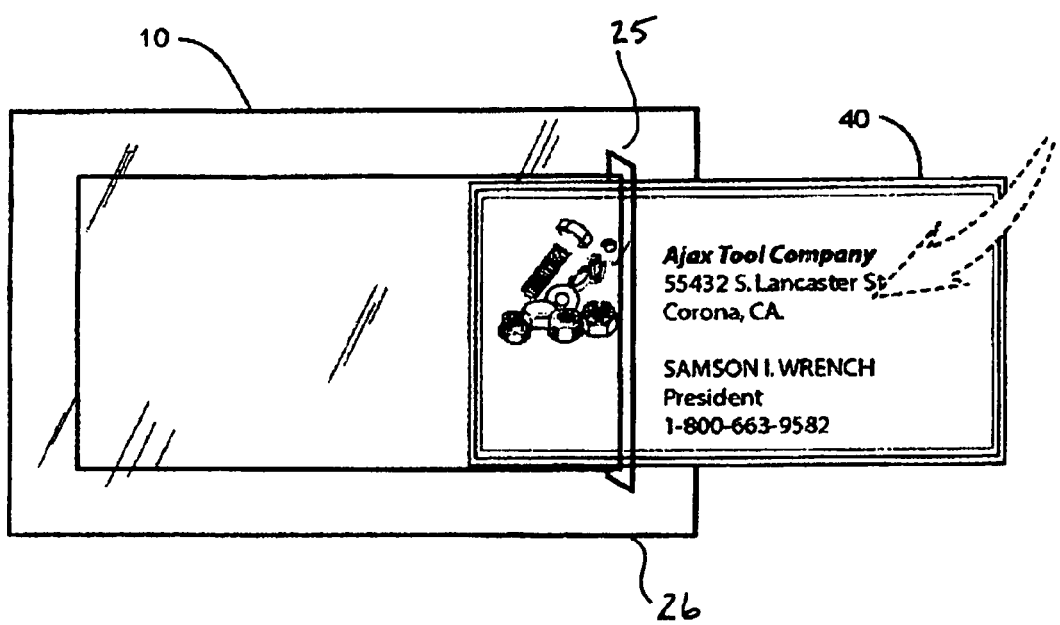
FIG. 2 is a plan view of a device for securing a business card to a surface, according to an embodiment of the present invention, with a business card secured therein.
Figure 3:
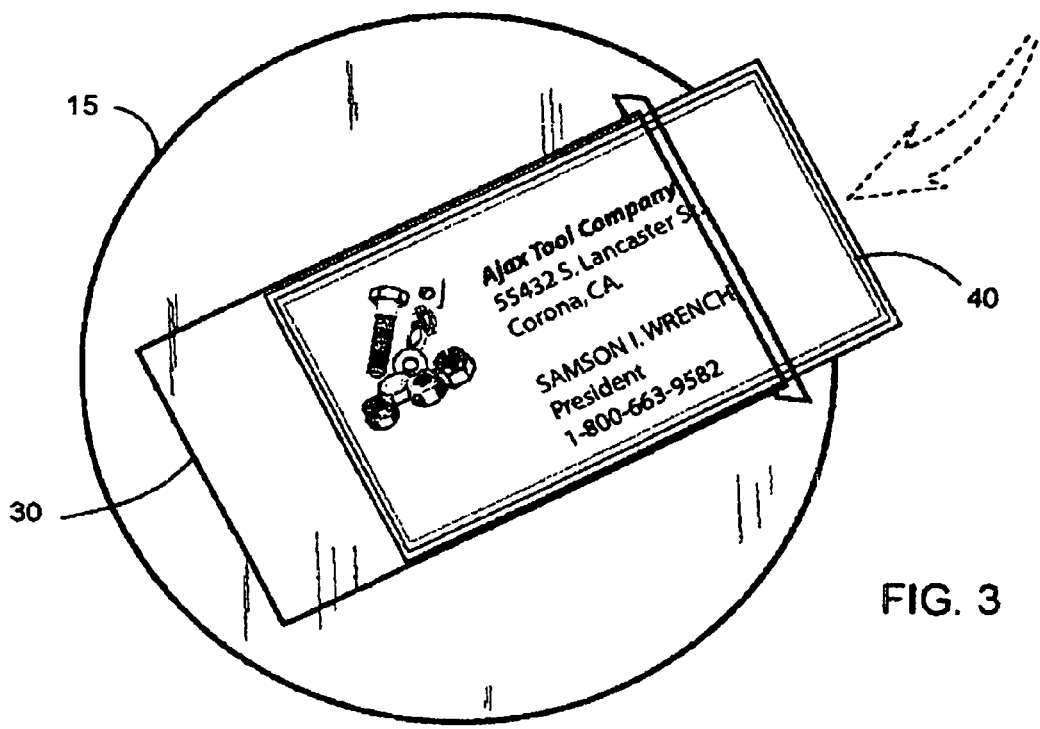
FIG. 3 is a plan view of a device for securing a business card to a surface, according to an embodiment of the present invention, with a business card secured therein.

In an embodiment of the invention shown generally in FIG. 2 and FIG. 3, the mounting device 10 may be a plastic envelope with one or more openings 25 along an edge or on the face of the front of the mounting device 30 for insertion of an identification device 40 such as a business card.

In a similar embodiment of the invention shown generally in FIG. 4, an adhesive may be applied to the back of the rear surface 20 of the mounting device 10 and the envelope may be affixed to the device or item sought 10 be identified 50.

The mounting device 10 may be supplied individually with a peel away backing material (not shown) that is releasably affixed to the adhesive applied to the back side of the rear surface 20 of the mounting device 10.

In an embodiment of the invention shown in FIG. 10, the mounting device 10 may be supplied on a roll containing a plurality of sleeves with a backing material that is releasably affixed to an adhesive applied to the back side of the rear surface 20 of the mounting device 10.

Although this invention has been described above with reference to particular means, materials and embodiments, it is to be understood that the invention is not limited to the disclosed particulars, but extends instead to all equivalents within the scope of the following claims.

What is claimed is:

1. A device for securing identification means to a mounting surface comprising:
    a printable substrate of adhesive label stock having a front side with an image area and a back side with peel-away backing, a border and outer edges; and,
    a coating of adhesive applied to the border of the front side of the substrate; and,
    a lamination of plastic film being planarly adhered to the adhesive border of the substrate; and,
    a portion of the printable substrate and the plastic film kiss-cut through to the peel-away backing leaving a
        i) a pocket bounded by the borders and residing between the plastic film and the front side of the substrate for the insertion and removal of business cards, and
        ii) a discardable border revealing the peel away backing around the image area.

2. The device for securing identification according to claim 1 in which the image area is viewable to the outer edges.

* * * * *